(12) United States Patent
Someno

(10) Patent No.: US 6,778,292 B1
(45) Date of Patent: Aug. 17, 2004

(54) PRINTER HOST AND STORAGE MEDIUM STORING THE OPERATION PROGRAM THEREFOR

(75) Inventor: Masahiro Someno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 661 days.

(21) Appl. No.: 09/639,886

(22) Filed: Aug. 17, 2000

(30) Foreign Application Priority Data

Aug. 19, 1999 (JP) ............................................ 11-232692
Aug. 19, 1999 (JP) ............................................ 11-232693

(51) Int. Cl.$^7$ ............................................. G06F 15/00
(52) U.S. Cl. ..................... 358/1.16; 358/1.15; 358/1.17
(58) Field of Search .............................. 358/1.16, 1.15, 358/1.12, 1.1, 1.14, 523, 1.17, 1.8, 1.9, 527, 453, 1.13; 711/100

(56) References Cited

U.S. PATENT DOCUMENTS 4,992,958 A 2/1991 Kageyama et al.
6,594,033 B1 * 7/2003 Kujirai et al. ............. 358/1.18

FOREIGN PATENT DOCUMENTS

EP 0 772 117 A1 5/1997

* cited by examiner

*Primary Examiner*—Twyler Lamb
(74) *Attorney, Agent, or Firm*—Sughrue Mion, PLLC

(57) ABSTRACT

A printer host comprising a list-forming unit for forming a band-corresponded drawing command list showing correspondence of respective drawing commands to a band or bands referring to a spool file stored in a hard disk device; a drawing command storage control unit which successively reads out the drawing commands corresponding to the respective bands from the spool file stored in the hard disk device according to the band-corresponded drawing command list, and stores the drawing command of one band that is read out in the drawing command memory; and an image data expanding unit which converts the drawing command of one band stored in the drawing command memory into image data and expands the image data in the band memory. This constitution makes it possible to decrease the number of drawing commands stored in the memory in the host.

14 Claims, 11 Drawing Sheets

FIG.7A
FIG.7B
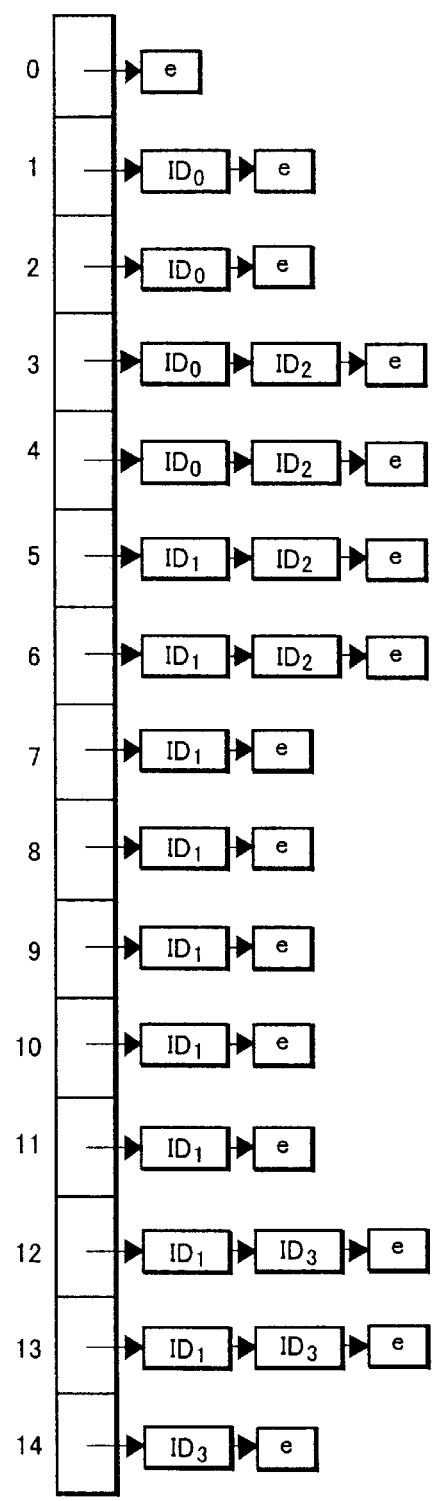
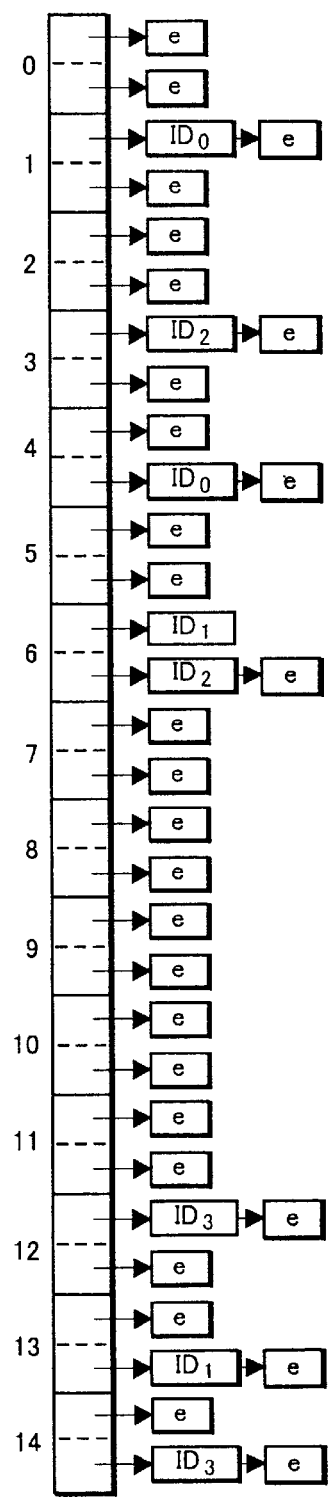

PRINTER HOST AND STORAGE MEDIUM STORING THE OPERATION PROGRAM THEREFOR

This application claims priority from Japanese Patent Applications Reference No.11-232692, filed Aug. 19, 1999 and No.11-232693, filed Aug. 19, 1999, the entire content of which is incorporated herein by reference for all purposes.

BACKGROUND OF THE INVENTION

The present invention relates to a printer host for expanding a bundle of drawing commands of one page stored as a spool file, into image data for each of the bands, and a storage medium storing an operation program therefor.

PRIOR ART

In general, as shown in FIGS. 1, 2 and 11, a bundle of drawing commands of one page is stored as a spool file 39 in a hard disk unit 26 of a printer host. At the time of printing, the spool file 39 stored in the hard disk unit 26 is directly and temporarily stored in a RAM 22 of the printer host. In order to expand the drawing command, as image data, in a band memory 55, the printer host prepares a band-corresponded drawing command full list 53c to show the correspondence of each of the drawing commands to the band or bands. The full list 53c shows memory addresses of the drawing commands corresponding to the respective bands. Next, reference is made to the memory addresses in the full list 35c, drawing commands corresponding to the respective bands are called from the spool file stored in a spool file memory 54c in RAM 22 and are expanded as image data on the band memory 55. The image data expanded on the band memory 55 are subjected to the RGB-CMYK color-changing processing and to the half-tone processing, converted into a command that can be interpreted by the printer, and are then sent to the printer.

Concretely described here is a case where an image shown in FIG. 9 is to be printed.

It is presumed here that the image is drawn on the regions of coordinates (0, 0) to (577, 992) and is processed being divided into five bands, i.e., 0-th band to fourth band. On the regions of coordinates (0, 0) to (577, 992) are drawn a triangle represented by a drawing command A, a square represented by a drawing command B, a circle represented by a drawing command C and an image represented by a drawing command D.

As shown in FIG. 10, in the spool file are stored data related to the drawing commands A, B, C and D of one page. For example, the drawing command A includes an operation code stating "draw a triangle", and three vertex coordinates of the triangle. The drawing command D includes an operation code for starting the imaging, diagonal point coordinates of a rectangular region of image, and image data.

When forming a band-corresponded drawing command list, it is learned to which band the image belongs from the coordinate data of image possessed by the respective drawing commands. As for the drawing command A representing a triangle, for example, it is learned that it belongs to the 0-th band and to the first band from the data of vertex coordinates of the triangle. Referring to FIG. 11, a band-corresponded drawing command full list 53c is formed in which the drawing command A is related to the 0-th band, the drawing command A and the drawing command C are related to the first band, the drawing command B and the drawing command C are related to the second band, the drawing command B is related to the third band, and the drawing command B and the drawing command D are related to the fourth band. As described above, however, the band-corresponded drawing command full list 53c is not the one in which the bands and the drawing commands are directly related to each other, but is the one in which the bands are related to the addresses in the RAM 22 storing the respective drawing commands.

According to the prior art, however, the spool file stored in the hard disk unit is directly stored in a memory; i.e., the memory must have a large storage capacity. In particular, very large storage capacity is necessary when a large number of drawing commands are included in the data of one page or when the drawing command includes image data.

According to the prior art, further, the drawing commands to be expanded in the bands are all related to all of the band columns in the band-corresponded drawing command list. Therefore, in the full list 53c shown in, for example, FIG. 11, the drawing command B is related to three bands, i.e., related to the second band, to the third band and to the fourth band. Thus, a large number of drawing commands (in practice, addresses of drawing commands) are picked up on the list, and the memory must have a large storage capacity. In particular, when the band width is narrow and there exist a large number of bands of one page in total, then, a single drawing command is related to many bands, and the number of the drawing commands picked up on the list becomes very large.

SUMMARY OF THE INVENTION

The present invention was accomplished in view of the above problems inherent in the prior art. And the object of the present invention is to provide a printer host capable of decreasing the quantity of data stored in the memory and a storage medium storing an operation program for the printer host.

To accomplish the object, the first printer host which comprises an auxiliary storage unit and a main storage unit, and expands a bundle of drawing commands of one page stored, as a spool file, in the auxiliary storage unit, into image data for each of bands of a predetermined band width, further comprises;

list-forming means for forming a band-corresponded drawing command list showing the correspondence of each of the drawing commands to the band or bands, by making reference to the spool file stored in the auxiliary storage unit;

a drawing command storage region which is a portion of the main storage unit and stores the drawing command of one band;

an image data expanding region which is another portion of the main storage unit and in which the image data of one band is expanded;

drawing command storage control means which successively reads out the drawing commands corresponding to the respective bands from the spool file stored in the auxiliary storage unit according to the band-corresponded drawing command list, and stores the drawing command of one band that is read out in the drawing command storage region; and image data expanding means which converts the drawing command of one band stored in the drawing command storage region into image data and expands the image data in the image data expanding region.

To accomplish the object, the second printer host according to the first printer host, comprises:

access judging means which judges whether a drawing command among the plural drawing commands is the one that is once stored in the drawing command storage region or is the one that has not yet been stored in the drawing command storage region but has been stored in the auxiliary storage unit; wherein when it is judged by the access judging means that the drawing command is the one that has not yet been stored in the drawing command storage region but has been stored in the auxiliary storage unit, the drawing command storage control means makes reference to the band-corresponded drawing command list and accesses to the auxiliary storage unit.

To accomplish the object, provided is the third printer host according to any one of the first printer host or the second printer host, wherein the list-forming means forms a drawing command difference list as the band-corresponded drawing command list, in which the start of drawing command representing the image is related to a band corresponding to the start position of the image at a moment when the plural drawing commands are expanded into images, and the end of the drawing command representing the image is related to a band corresponding to the end position of the image when each of the plural drawing commands is expanded into images.

To accomplish the object, provided is the fourth printer host according to the third printer host, wherein the list-forming means forms a one-band drawing command list as a portion of the band-corresponded drawing command list by referring to the drawing command difference list, in which the drawing commands corresponding to one band are all related to the one band in which the image expansion is to be carried out from now, and the drawing command storage control means makes reference to the one-band drawing command list and stores the drawing command of one band in the drawing command storage region.

To accomplish the object, the first storage medium for a printer host having an auxiliary storage unit and a main storage unit, stores a program which expands a bundle of drawing commands of one page stored, as a spool file, in the auxiliary storage unit, into image data for each of the bands of a predetermined band width, the storage medium storing the program which comprises the steps of:

forming a band-corresponded drawing command list showing the correspondence of each of the drawing commands to the band or bands by making reference to the spool file stored in the auxiliary storage unit;

successively reading out drawing commands corresponding to the respective bands from the spool file stored in the auxiliary storage unit according to the band-corresponded drawing command list, and storing the drawing command of one band that is read out in the drawing command storage region which is a portion of the main storage unit for storing the drawing command of one band; and converting the drawing command of one band stored in the drawing command storage region into image data and expanding the image data in the image data expanding region which is another portion of the main storage unit for expanding the image data of one band.

To accomplish the object, the second storage medium according to the first storage medium, stores a program comprising a step of:

judging whether a drawing command among the plural drawing commands is the one that is once stored in the drawing command storage region or is the one that has not yet been stored in the drawing command storage region but has been stored in the auxiliary storage unit; wherein when it is judged by the access judging step that the drawing command is the one that has not yet been stored in the drawing command storage region but has been stored in the auxiliary storage unit, the drawing command storage control step accesses the auxiliary storage unit.

To accomplish the object, the third storage medium according to any one of the first storage medium or the second storage medium, stores a program comprising a step of forming a drawing command difference list as the band-corresponded drawing command list, wherein the start of drawing command representing the image is related to a band corresponding to the start position of the image at a moment when the plural drawing commands are expanded into images, and the end of the drawing command representing the image is related to a band corresponding to the end position of the image when each of the plural drawing commands are expanded into images.

According to the invention as described above, the band-corresponded drawing command list is formed by making reference to the spool file stored in the auxiliary storage unit and, then, the drawing command related only to the desired band is called from the auxiliary storage unit by making reference to the list and is stored in the memory which is the main storage unit. Therefore, the memory region of only one band is enough for storing the drawing command, and the data quantity that needs be stored in the memory can be greatly reduced.

To accomplish the object, the fifth printer host expanding a bundle of drawing commands of one page stored as a spool file into image data for each of the bands of a predetermined band width, the printer host comprises:

list-forming means for forming a drawing command difference list in which the start of drawing command representing the image is related to a band corresponding to the start position of the image and the end of the drawing command representing the image is related to a band corresponding to the end position of the image when each of the plural drawing commands is expanded into images by making reference to the spool file;

an image data expanding region where the image data of one band are expanded; and drawing command processing means for successively reading out the drawing commands corresponding to the respective bands from the spool file based upon the drawing command difference list, converts the drawing command of one band that is read out into image data, and expands the image data in the image data expanding region.

To accomplish the object, provided is the sixth printer host according to the fifth printer host, wherein:

the list-forming means forms a one-band drawing command list by making reference to the drawing command difference list, in which the drawing commands corresponding to one band are all related to the band in which the image expansion is to be carried out; and the drawing command processing means makes reference to the one-band drawing command list to convert the drawing command of one band into image data, and expands the image data in the image data expanding region.

To accomplish the object, the seventh printer host according to the fifth or the sixth printer host, comprises:

an auxiliary storage unit storing the spool file; and a main storage unit in which are formed a drawing command storage region storing therein the drawing command of one band, and the image data expanding region; wherein the drawing command processing means comprising:

drawing command storage control means successively reading out the drawing commands corresponding to the respective bands from the spool file stored in the auxiliary storage unit based on the drawing command difference list, and storing the drawing command of one band that is read out in the drawing command storage region; and image data expanding means for converting the drawing command of one band stored in the drawing command storage region into image data and for expanding the image data in the image data expanding region.

To accomplish the object, the eighth printer host which according to the fifth or the sixth printer host, comprises:

a main storage unit in which are formed a spool file storing region storing the spool file, and the image data expanding region; wherein the drawing command processing means comprises image data expanding means which successively reads out the drawing commands corresponding to the respective bands from the spool file stored in the spool file storage region of the main storage unit based on the drawing command difference list, converts the drawing command of one band that is read out into image data and expands the image data in the image data expanding region.

To accomplish the object, the fourth storage medium stores a program which expands a bundle of drawing commands of one page stored as a spool file into image data for each of the bands having a predetermined band width, the storage medium further stores the program which comprises the steps of:

forming a drawing command difference list by making reference to the spool file, wherein the start of drawing command representing the image is related to a band corresponding to the start position of the image and the end of the drawing command representing the image is related to a band corresponding to the end position of the image when the plural drawing commands are expanded into images; and successively reading out the drawing commands corresponding to the respective bands from the spool file based on the drawing command difference list, converting the drawing command of one band that is read out into image data and expanding the image data in the image data expanding region.

To accomplish the object, the fifth storage medium according to the fourth storage medium, stores a program wherein:

the list-forming step forms a one-band drawing command list by making reference to the drawing command difference list, in which the drawing commands corresponding to one band are all related to the band in which the image expansion is to be carried out; and the drawing command processing step makes reference to the one-band drawing command list to convert the drawing command of one band into image data and expands the image data in the image data expanding region.

According to the invention related to the fifth to eighth printer hosts and the invention related to the fourth and fifth storage media, employed is the drawing command difference list in which a start band and an end band of image represented by the drawing command are related, in order to call a desired drawing command from the spool file. Therefore, the quantity of data used for the list can be decreased compared to that of the conventional band-corresponded drawing command full list in which all of the drawing commands to be expanded in the respective bands are related to all of the band columns.

BRIEF DESCRIPTION OF THE DRAWINGS

FIG. 7(A) is a diagram illustrating a band-corresponded drawing command full list related to the image of FIG. 6;

FIG. 7(B) is a diagram illustrating a band-corresponded drawing command difference list related to the image of FIG. 6;

DESCRIPTION OF THE PREFERRED EMBODIMENTS

Embodiments of the printer host according to the present invention will now be described with reference to the drawings.

The first embodiment of the printer host of the present invention will now be described with reference to FIGS. 1 to 3.

Figure 1:
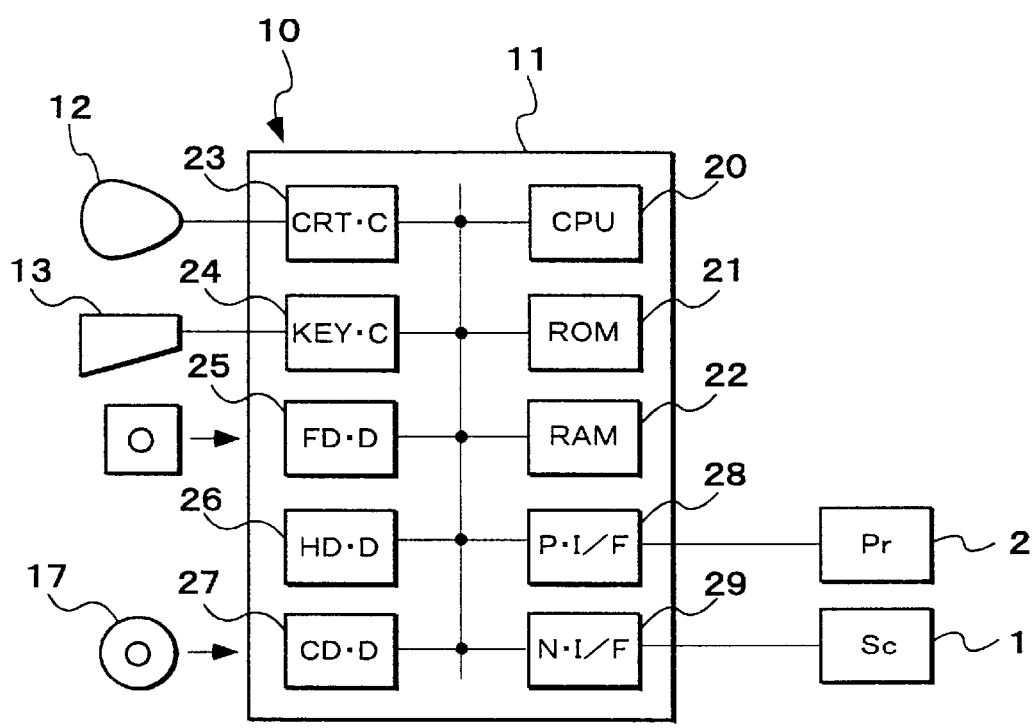
FIG. 1 is a block diagram of a circuit of a printer host according to a first embodiment of the invention.

As shown in FIG. 1, a printer host 10 of the embodiment is combined with a scanner 1 and a printer 2 thereby to constitute a printer system.

The printer host 10 includes a host body 11, a display 12 and a keyboard 13. As hardware, the host body 11 includes a CPU 20 for executing various programs, a ROM 21 storing various data and various programs, a RAM 22 for temporarily storing various data and programs, a display controller 23 for controlling the display 12, a keyboard controller 24 for controlling the keyboard 13, a floppy disk device 25, a hard disk device 26, a CD drive device 27, a printer interface 28 to which the printer, etc., are connected and a scanner interface 29 to which the scanner, etc. are connected.

Figure 2:
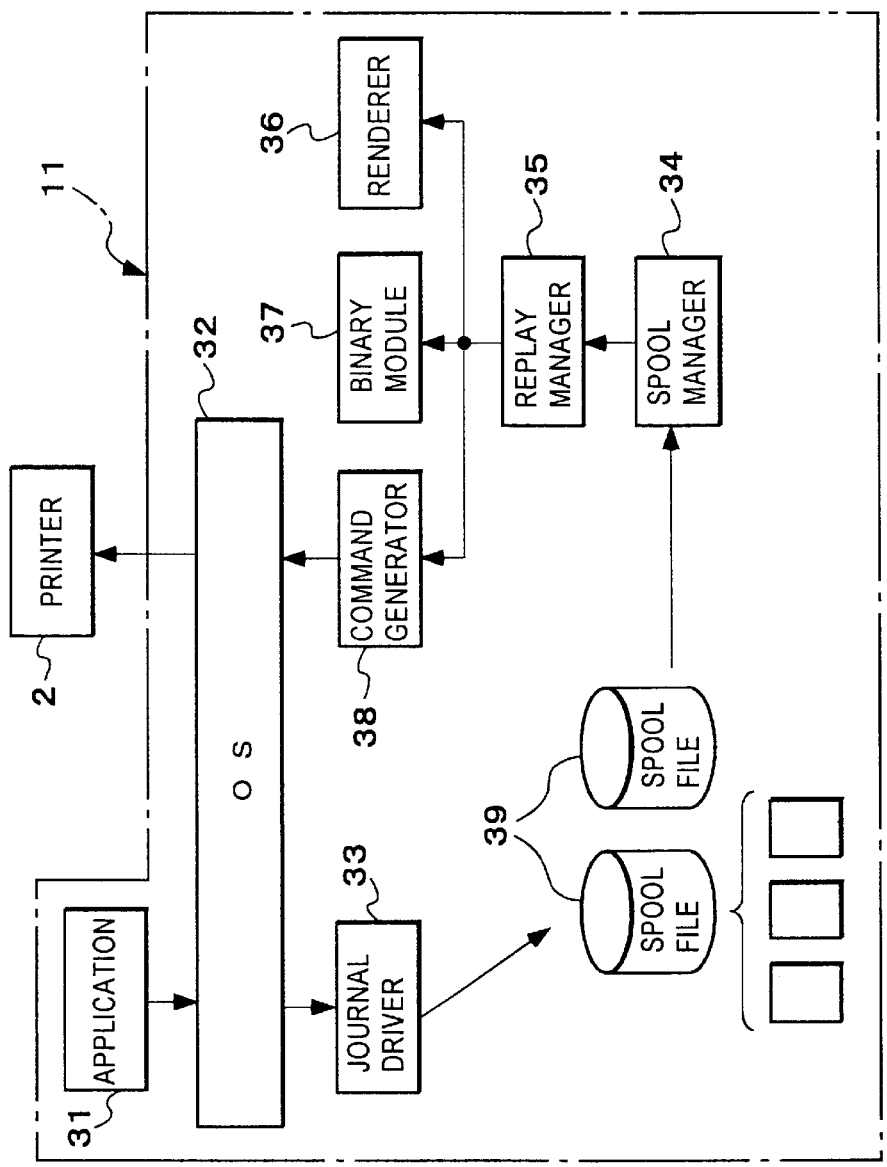
FIG. 2 is a diagram illustrating the constitution of a software in the printer host according to the first embodiment of the invention.

As software, the host body 11 includes, as shown in FIG. 2, an application 31, an operating system 32, a journal driver 33 that stores a drawing command received from the application 31 as a spool file 39, a spool manager 34 for managing the call of drawing command from the spool file 39, a replay manager 35 for managing the replay of the drawing command in the spool file 39, a renderer 36 for expanding the drawing command as RGB image data, a binary module 37 for converting the RGB image data into CMYK binary image data, and a command generator 38 for converting the CMYK binary image data into a command that can be interpreted by the printer 2.

The above software-constituting elements all work upon replaying a program stored in the CD 17 (shown in FIG. 1) using a CD drive device 27, loading the program in the RAM 22, and executing the program by the CPU 20.

Figure 3:
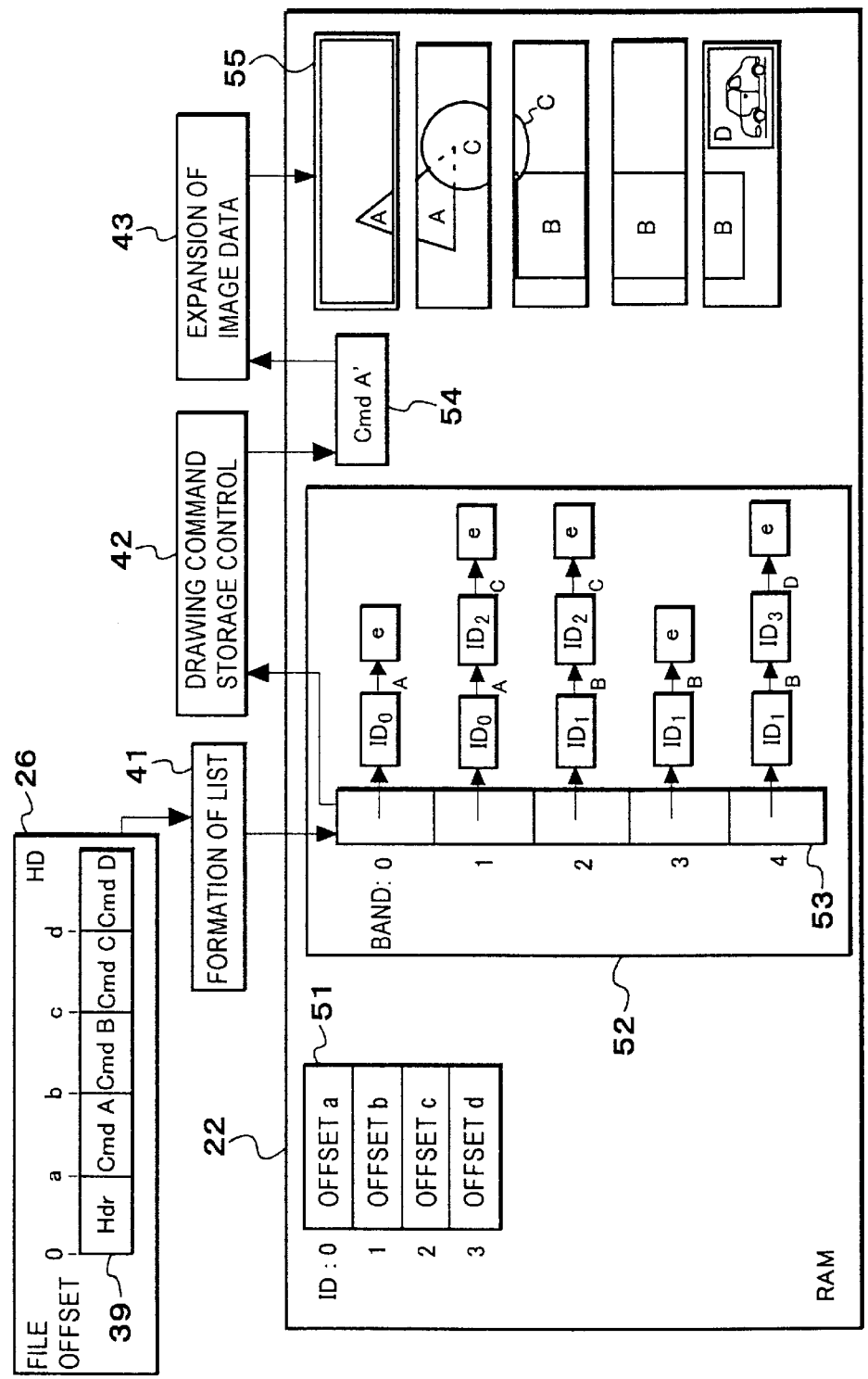
FIG. 3 is a block diagram illustrating the function of the printer host according to the first embodiment of the invention.

As shown in FIG. 3, the host body 11 further includes, as major functions, a list-forming unit (list-forming means) 41 for forming a band-corresponded drawing command full list 53 that shows the correspondence of each of the drawing commands to the band or bands by making reference to the spool file 39 stored in the hard disk device 26; a drawing command storage control unit (drawing command storage control means) 42 for successively reading out the drawing commands corresponding to the respective bands from the spool file 39 stored in the hard disk device 26 and for storing them in the RAM 22 according to the band-corresponded drawing command full list 53; and an image data expanding unit (image data expanding means) 43 for converting the drawing command stored in the RAM 22 into image data and for expanding them.

Figure 9:
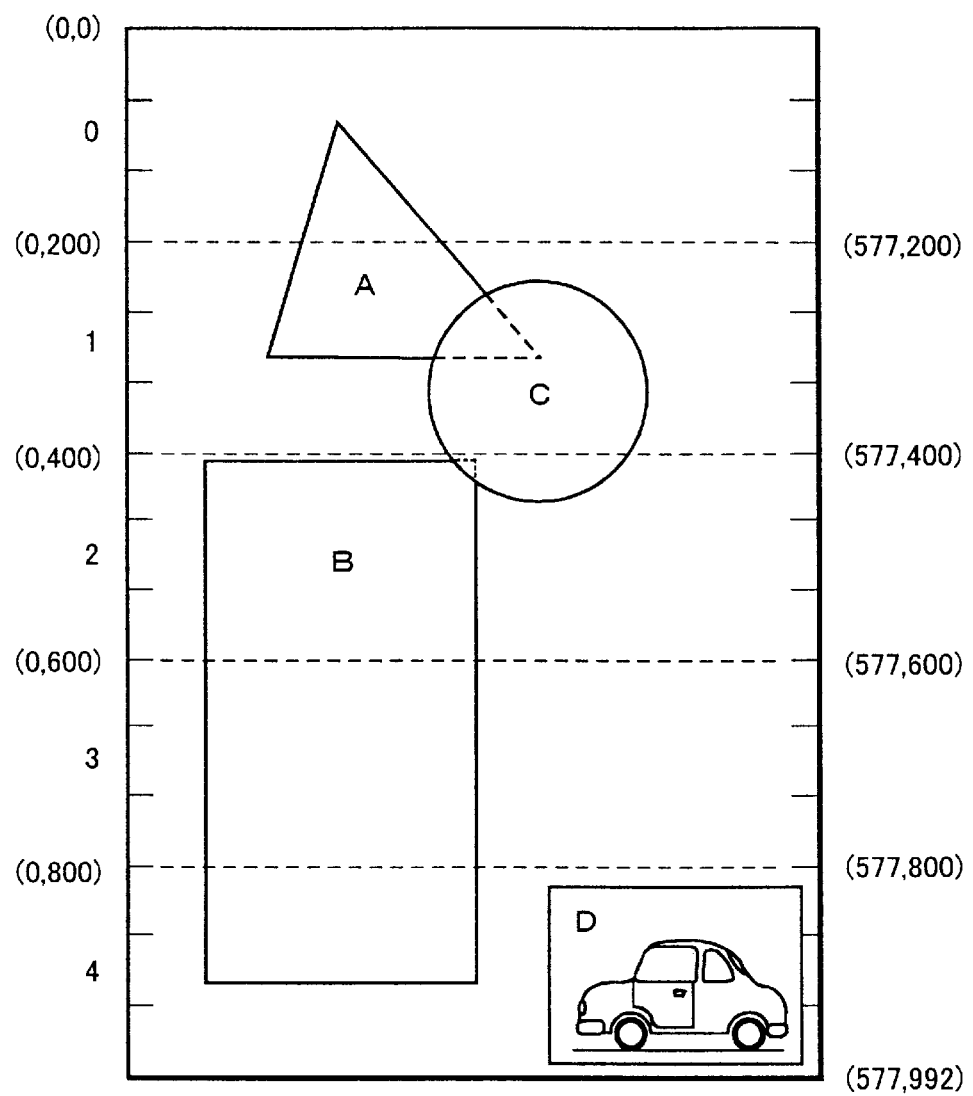
FIG. 9 is a diagram illustrating an image (divided into fifteen) of one page.
Figure 10:
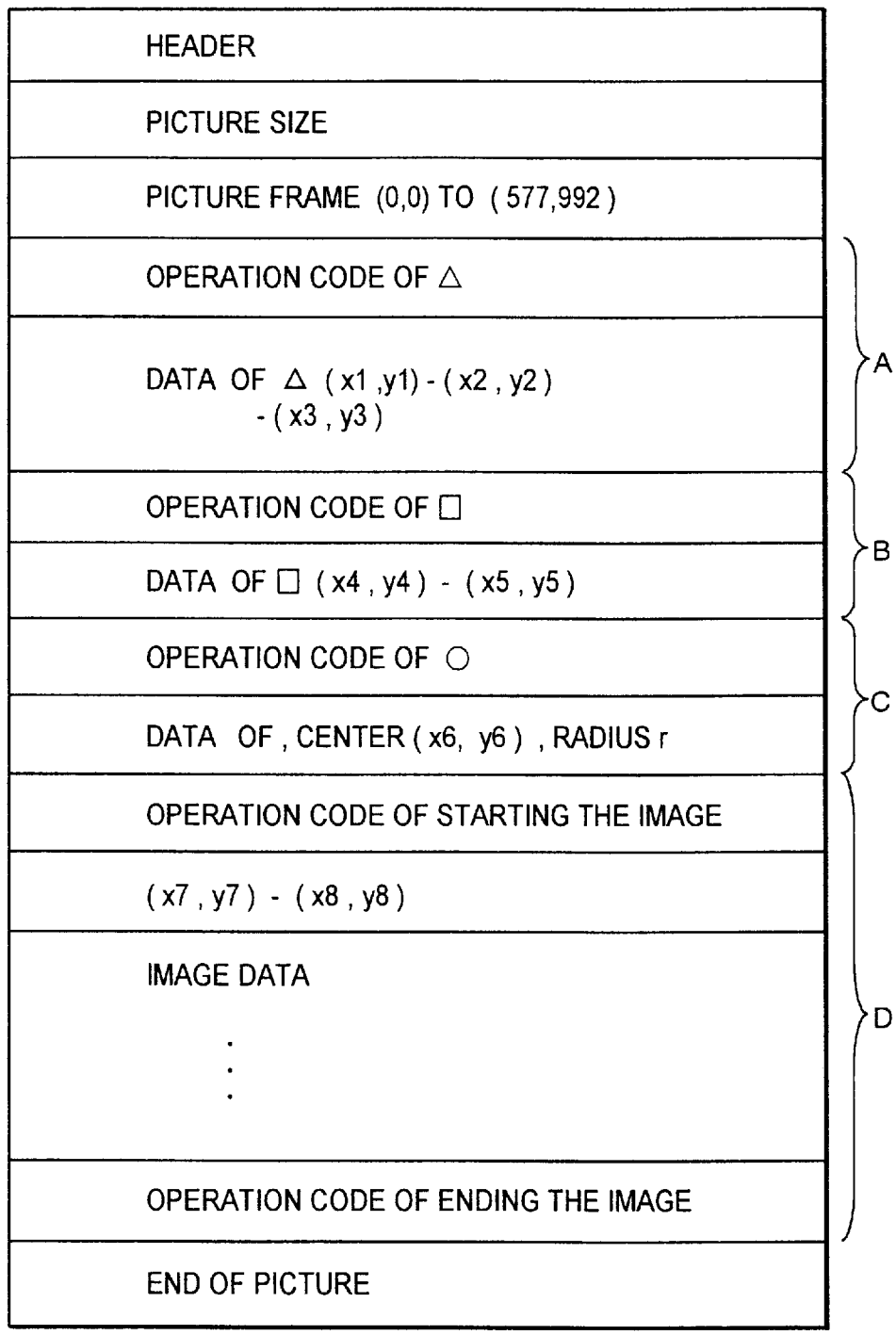
FIG. 10 is a diagram illustrating the constitution of a spool file related to the image of one page.
Figure 11:
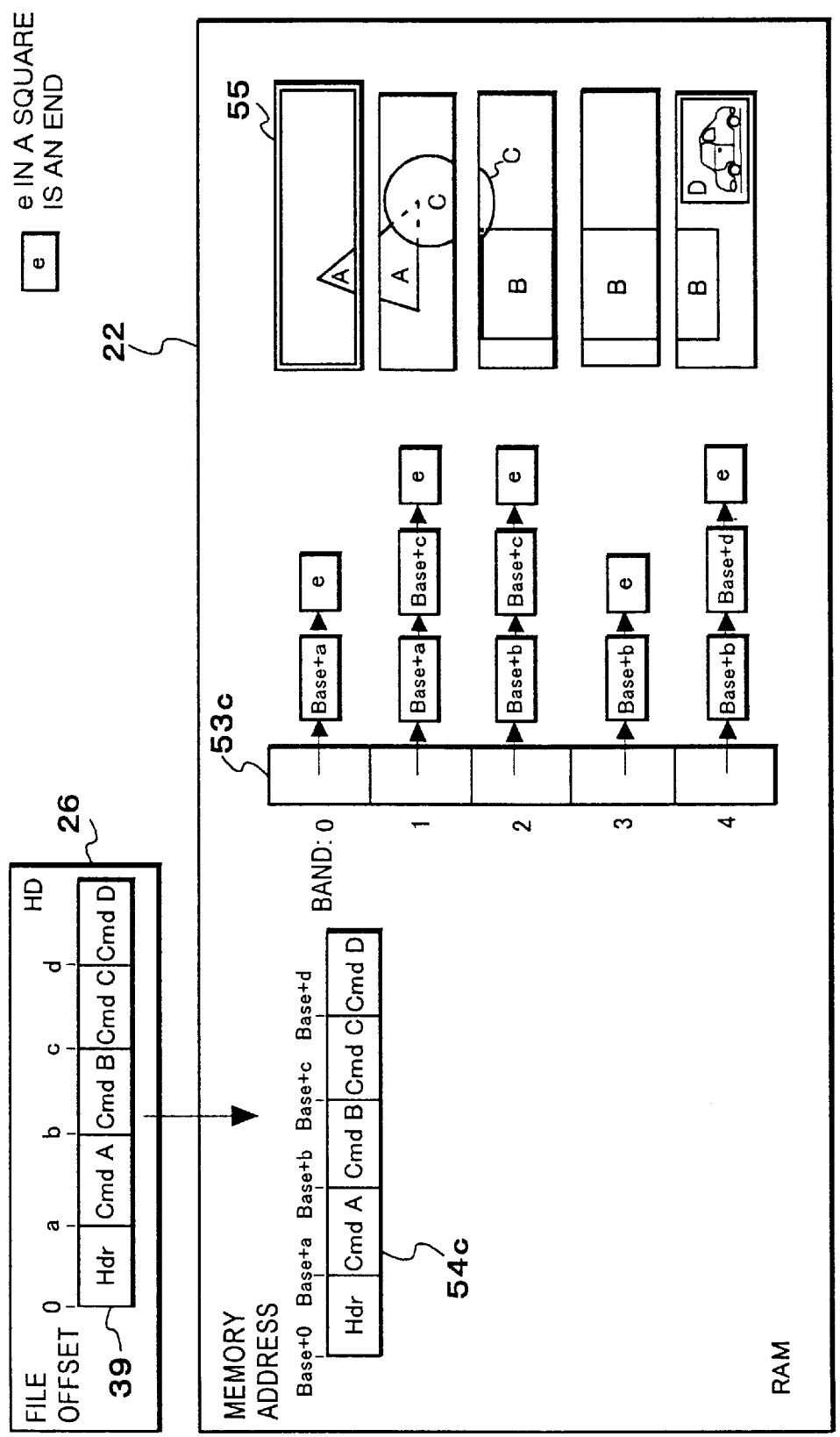
FIG. 11 is a diagram illustrating a method of expanding the drawing commands of one page stored in a spool file into image according to the prior art.

The hard disk device 26 that is the auxiliary storage unit stores a spool file 39 that is the same as the one described in relation to the prior art with reference to FIGS. 9 and 10. The data in the spool file 39 and the image that are expanded, are the same in all of the embodiments that will be described later. The RAM 22 which is the main storage unit includes a list table 52 in which the band-corresponded drawing command fill list 53 is expanded, an offset table 51 in which are expanded the offset values of drawing commands in the spool file 39 stored in the hard disk device 26, a drawing command memory (drawing command storage region) 54 in which the drawing command of one band is expanded, and a band memory (image data expanding region) 55 in which image data of one band are expanded.

The list-forming unit 41 and the drawing command storage control unit 42 work upon executing the replay manager 35 (FIG. 2) as a software, and the image data expanding unit 43 works upon executing the renderer 36 (FIG. 2) as software.

Operations of the each of functional units will now be described.

The list-forming unit 41, first, examines offset values a, b, c and d of the drawing commands A, B, C and D in the spool file 39 stored in the hard disk device 26, and stores them in the offset table 51 in the RAM 22 in correspondence to the offsets IDs. Next, the list-forming unit 41 forms a band-corresponded drawing command full list 53 and stores it in the list table 52 in the RAM 22.

As described earlier with reference to the prior art, the band-corresponded drawing command full list 53 is the one in which the drawing command A is related to the 0-th band, the drawing command A and the drawing command C are related to the first band, the drawing command B and the drawing command C are related to the second band, the drawing command B is related to the third band, and the drawing command B and the drawing command D are related to the fourth band. Here, the band-corresponded drawing command full list 53 does not directly relate the bands to the drawing commands, but relates the bands to the offset values in the hard disk device 26 in which the drawing commands are stored. In the band-corresponded drawing command full list 53, therefore, ID0 which is an ID of the offset value of the drawing command A is related to the 0-th band, and ID0 and ID2 which are IDs of the offset values of the drawing commands A and C are related to the first band.

When the full list 53 is formed, the drawing command storage control unit 42 makes reference to the full list 53, to know that the drawing command A is expanded in the 0-th band, and picks up an offset value corresponding to the offset ID0 stored in the offset table 51 from the offset ID0 of the drawing command A shown in the full list 53. The drawing command storage control unit 42 calls the drawing command A from a portion of offset value a of the hard disk device 26, and stores the drawing command A in the drawing command memory 54 in the RAM 22.

When the drawing command A is stored in the drawing command memory 54, the image data expanding unit 43 expands the drawing command A in the band memory 55 as RGB image data. As described with reference to FIG. 2, the RGB image data expanded in the band memory 55 are converted into CMYK binary image data through the binary module 37. The CMYK binary image data are further converted into a printer command through the command generator 38, and are output to the printer 2.

In the first band and in the subsequent bands, the drawing command storage control unit 42 makes reference to the list 53 like in the 0-th band to know that the drawing commands A and C are expanded in the first band, and picks up the offset values a and c corresponding to the offsets ID0 and ID2 stored in the offset table 51 from the offsets ID0 and ID2 of the drawing commands A and C shown in the full list 53. The drawing command storage control unit 42 further calls the drawing commands A and C from the portions of offset values a and c of the hard disk device 26, and stores the drawing commands A and C in the drawing command memory 54 in the RAM 22. The image data expanding unit 43 expands the drawing commands A and C in the band memory 55 as RGB image data.

According to this embodiment as described above, the band-corresponded drawing command full list 53 is formed and, then, reference is made to the full list 53 to call a drawing command related only to a desired band from the hard disk device 26 to store in the RAM 22. Therefore, the region of only one band is needed for storing the drawing command in the RAM 22, and the data quantity stored in the RAM 22 cab be greatly decreased compared to when the drawing commands of one page are all stored in the RAM as done in the prior art.

The printer host according to a second embodiment of the present invention will now be described with reference to FIG. 4. AS hardware, the printer host of this embodiment has the same constitution as that of the first embodiment shown in FIG. 1, and is different from the first embodiment only in the functional constitution.

The printer host body includes, as major functions, a list-forming unit 41 similar to that of the first embodiment, an access judging unit (access judging means) 44 for judging whether the drawing command is once stored in the drawing command memory 54a, a drawing command storage control unit 42a for calling a desired drawing command by making an access to the hard disk device 26 depending upon the judged result of the access judging unit 44 and for storing the drawing command in the drawing command memory 54a, and an image data expanding unit 43 similar to that of the first embodiment.

Next, operations of each of the functional units will be described.

The list-forming unit 41 examines the offset values a, b, c and d of drawing commands A, B, C and D in the spool file 39, and stores them in the offset table 51 in the RAM 22 in correspondence to the offsets IDs similarly to the first embodiment. The access judging unit 44 forms, in the RAM 22, an access judgement flag 56 showing whether the drawing commands are the ones that are once stored in the drawing command memory 54a in correspondence to the offsets ID0, ID1, ID2, ID3 and ID4 of the drawing commands A, B, C and D. The access judgement flag 56 is set to "1" when the drawing command is the one that is once stored in the drawing command memory 54a, and is set to "0" when the drawing command has not yet been stored in the drawing command memory 54a but has been stored in the hard disk device 26. Next, the list-forming unit 41 forms a band-corresponded drawing command full list 53 in the same manner as in the first embodiment, and stores it in the list table 52 in the RAM 22.

When the full list 53 is formed, the drawing command storage control unit 42a makes reference to the full list 53, to know that the drawing command A is expanded in the 0-th band, and knows whether the drawing command A is the one that is once stored in the drawing command memory 54a by making reference to the access judgement flag 56 that corresponds to the offset ID0 of the drawing command A shown in the full list 39. In this case, the access judgement flag 56 corresponding to the offset ID0 of the drawing command A is "0". It is therefore so understood that the drawing command A has not yet been stored in the drawing command memory 54a but has been stored in the hard disk device 26. Then, similar to the first embodiment, the drawing command storage control unit 42a picks up an offset value a corresponding to the offset ID0 stored in the offset table 51, calls the drawing command A from a portion of the offset value a of the hard disk device 26, and stores the drawing command A in the drawing command memory 54a in the RAM 22.

When the drawing command storage control unit 42a stores the drawing command A in the drawing command memory 54a, the access judging unit 44 changes the access judgement flag 56 corresponding to the offset ID0 of the drawing command A to "1". In this case, the list-forming unit 41 changes the offset value a related to the offset ID0 in the offset table 51 into a memory address of the drawing command A in the drawing command memory 54a. The offset value a of the drawing command A is stored in the drawing command memory 54a in correspondence to the drawing command A. That is, the offset value a of the drawing command A is saved in the drawing command memory 54a.

When the drawing command A is stored in the drawing command memory 54a, the image data expanding unit 43, referring to the memory address related to the ID0 in the offset table 51, calls the drawing command A from the drawing command memory 54a, and expands it in the band memory 55 as RGB image data in the same manner as in the first embodiment. The drawing command storage control unit 42a learns from the full list 53 that the drawing commands other than the drawing command A are not used for the drawing and, hence, erases, from the drawing command memory 54a, any drawing command, other than the drawing command A, for which the access judgement flag 56 is set to "1".

When the drawing command of the 0-th band is expanded into an image, the drawing command storage control unit 42a makes reference to the full list 53 again to examine the drawing command that is to be expanded to the next first band, and understands that the drawing command A and the drawing command C are expanded in the first band. Next, reference is made to the access judgement flag 56 corresponding to ID0 and ID2 of the drawing commands A and C shown in the full list 53 to understand whether the drawing commands A and C are those that are once stored in the drawing command memory 54a. In this case, the access judgement flag 56 corresponding to the offset ID0 of the drawing command A has been set to "1" and the drawing command A has been stored already in the drawing command memory 54a. Therefore, the drawing command storage control unit 42a does not make access to the hard disk unit 26 in connection with the drawing command A. On the other hand, the access judgement flag 56 corresponded to the offset ID2 of the drawing command C is "0". Therefore, the drawing command storage control unit 42a makes an access to the hard disk unit 26 in connection with the drawing command C, and stores the drawing command C in the drawing command memory 54a. When the drawing command storage control unit 42a stores the drawing command C in the drawing command memory 54a, the access judging unit 44 changes the access judgement flag 56 corresponding to the offset ID2 of the drawing command C to "1". In this case, the list-forming unit 41 changes the offset value c related to the offset ID2 of the offset table 51 into a memory address of the drawing command C in the drawing command memory 54a.

When the drawing command C is stored in the drawing command memory 54a, the image data expanding unit 43 makes reference to the memory addresses related to ID0 and ID2 of the offset table 51, calls the drawing commands A and C from the drawing command memory 54a, and expands them on the band memory 55 as RGB image data. The drawing command storage control unit 42a learns from the full list 53 that the drawing command A is not used for drawing in the subsequent bands and, hence, erases, from the drawing command memory 54a, the drawing command A for which the access judgement flag 56 is set to "1".

The same also holds for the second and subsequent bands.

In this embodiment like in the first embodiment, the data quantity stored in the RAM 22 can be reduced. Besides, as access is not made again to the hard disk device 26 for those drawing commands that are once called from the hard disk device 26 and are stored in the RAM 22, it decrease the access number of times to the hard disk device 26 and enables the drawing commands of one page to be expanded into image within short periods of time.

Next, the printer host according to a third embodiment of the present invention will be described with reference to FIG. 5.

Concerning the major functions, the printer host body is basically the same as that of the second embodiment. Here, however, a list formed by the list-forming unit 41b is different from that of the first and second embodiments. The list-forming unit 41b according to this embodiment forms a drawing command difference list 53a and a one-band drawing list 53b as the band-corresponded drawing command list.

The drawing command difference list 53a relates the start of the drawing command representing the image to a band corresponding to the start position of the image at the time when the plural drawing commands are expanded to their respective images, and relates the end of the drawing command representing the image to a band corresponding to the end position of the image at the time when the plural drawing commands are expanded to their respective images.

Concretely speaking, the band columns of the difference list 53a are divided into start columns to which the start of the drawing commands is related and to the end columns to which the end of the drawing commands is related. Then, the drawing commands corresponding to the start columns and the end columns of the band columns are successively related respectively. In this embodiment, the image represented by the drawing command A becomes a start position for the 0-th band. Therefore, the drawing command A is related to the start column of the 0-th band column. No image of any drawing commands serves as the end position. Therefore, no drawing command is related to the end column of the 0-th band column, and "e" is attached to represent an end. As for the first band, the image represented by the drawing command C serves as the start position. Therefore, the drawing command C is related to the start column of the first band column. Since the image represented by the drawing command A becomes the end position, the drawing command A is related to the end column of the first band column. Likewise, the drawing commands are related to the second band column and to the subsequent band columns.

In the one-band drawing list 53b, the drawing commands corresponding to one band is all related to the one band, in which the image expansion is to be carried out, and is the same as the list of one band in the band-corresponded drawing command full list 53 in the first and second embodiments.

Next, the operations of each of the functional units will be described next.

After forming an offset table, 51, the list-forming unit 41b forms the command difference list 53a mentioned above and, then, forms a one-band drawing command list 53b related only to the 0-th band.

The drawing command storage control unit 42a makes reference to the one-band command list 53b, calls the drawing command A related to the 0-th band stored in the hard disk device 26, and stores it in the drawing command memory 54b. Thereafter, the image data expanding unit 43 makes reference to the memory address related to the ID0 of the offset table 51, calls the drawing command A from the drawing command memory 54b, converts it into the RGB image data and expands the data on the band memory 55 in basically the same manner as in the second embodiment.

Figure 5:
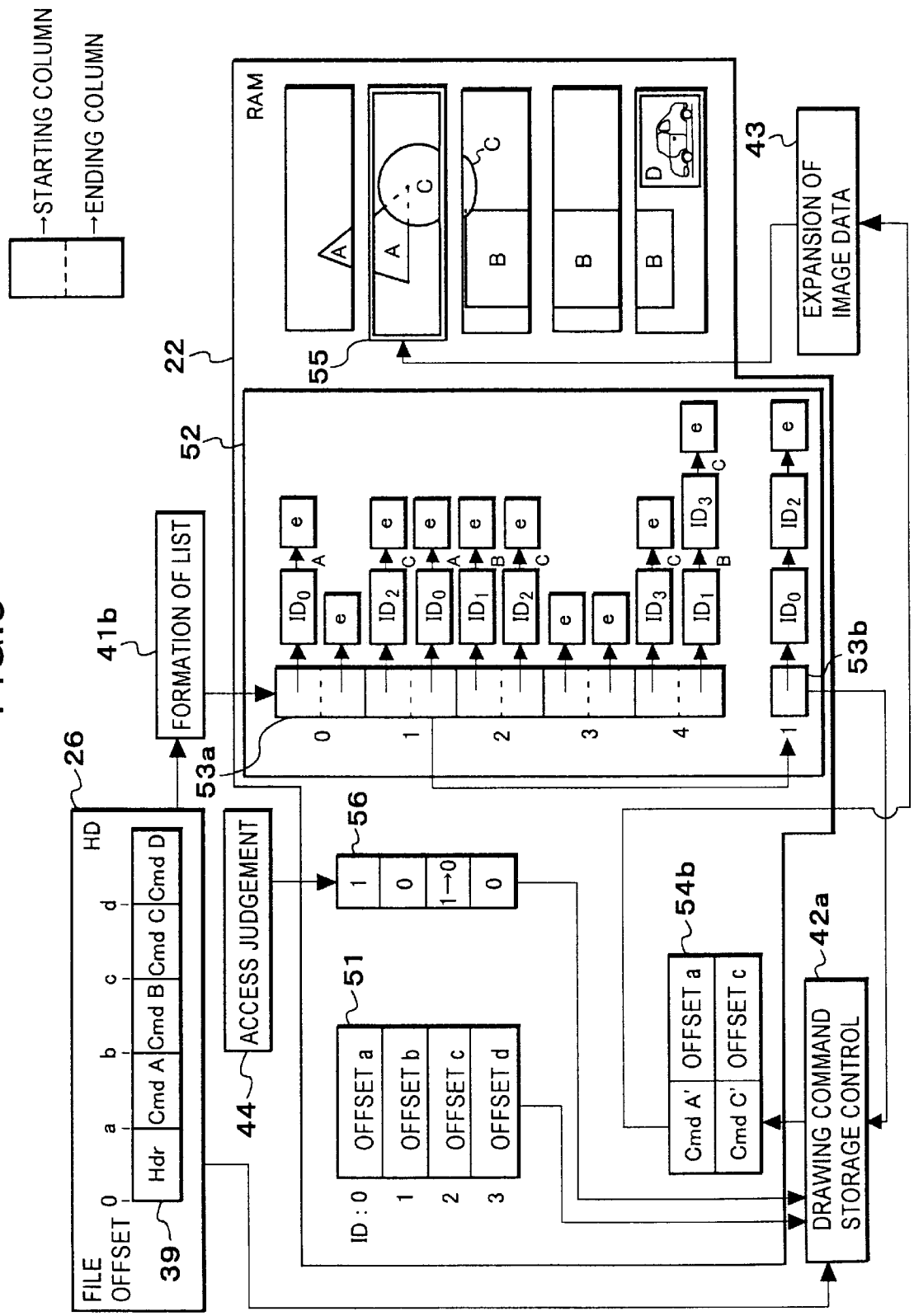
FIG. 5 is a block diagram illustrating the function of the printer host according to a third embodiment of the invention.

When the drawing command of the 0-th band is expanded into image, the list-forming unit 41b makes reference again to the drawing command difference list 53a, to form a one-band drawing command list 53b related to the next first band, and overwrites it on the one-band drawing list related to the 0-th band (FIG. 5 shows the one-band drawing command list 53b related to the first band). That is, the one-band drawing list related to the 0-th band is erased at a moment when the one-band drawing command list 53b related to the first band is formed. Next, the drawing command storage control unit 42a makes reference to the one-band drawing command list 53b related to the first band, examines the drawing command to be expanded in relation to the first band, and understands that the drawing command A and the drawing command C are expanded on the first band. Next, reference is made to the access judgement flag 56 corresponding to ID0 and ID2 of the drawing commands A and C shown in the one-band drawing command list 53b to know whether the drawing commands A and C are those that are once stored in the drawing command memory 54b. In this case, the access judgement flag 56 corresponding to the offset ID0 of the drawing command A has been set to "1", and the drawing command A has been stored already in the drawing command memory 54b. Therefore, the drawing command storage control unit 42a does not access the hard disk device 26 concerning the drawing command A. On the other hand, the access judgement flag 56 corresponding to the offset ID2 of the drawing command C has been set to "0". Accordingly, the drawing command storage control unit 42a accesses the hard disk device 26 concerning the drawing command C, and stores the drawing command C in the drawing command memory 54b. As the drawing command storage control unit 42a stores the drawing command C in the drawing command memory 54b, the access judgment unit 44 changes the access judgement flag 56 corresponding to the offset ID2 of the drawing command C into "1". Here, the lift-forming unit 41b changes the offset value c related to the offset ID2 of the offset table 51 into a memory address of the drawing command C in the drawing command memory 54b.

As the drawing command C is stored in the drawing command memory 54b, the image data expanding unit 43 makes reference to the memory addresses related to ID0 and ID2 of the offset table 51, calls the drawing commands A and C from the drawing command memory 54b, and expands them on the band memory 55 as RGB image data. When the drawing commands A and C are expanded into image, the drawing command storage control unit 42a erases the drawing command A from the drawing command memory 54b.

It can be learned in a step where reference is made to the drawing command difference list 53a for expanding the first command into image that the drawing command A ends when it is expanded to image in the first band or, in other words, that the command A is no longer used in the subsequent bands. The drawing command storage control unit 42a learns this fact in advance and erases the drawing command A from the drawing command memory 42b when the drawing commands A and C related to the first band are expanded to image.

The same holds in the second and subsequent bands.

In this embodiment, too, as described above, the band-corresponded drawing command lists 53a and 53b are formed and, then, a reference is made to the list 53b to call the drawing command related only to the desired band from the hard disk device 26 to store it in the RAM 22. Therefore, the region of only one band is enough for storing the drawing command in the RAM 22, and the data quantity stored in the RAM 22 can be decreased compared with the prior art in which the drawing commands of one page are all stored in the RAM.

In this embodiment which uses the drawing command difference list 53a, further, the number of drawing commands (in practice, IDs of drawing commands) picked up on the list is smaller than that of the case when there is used the band-corresponded drawing command full list 53 in which the drawing commands to be expanded on each of the bands are all related to each of the band columns as is done in the prior art. In this respect, too, therefore, the data quantity stored in the RAM 22 can be reduced.

The effect resulting from the use of the drawing command difference list will now be described in detail with reference to FIGS. 6 and 7.

Use of the drawing command difference list makes it possible to decrease the access number of times to the hard disk device 26 and to decrease the data quantity as the command-corresponded drawing command list does as described earlier.

Figure 4:
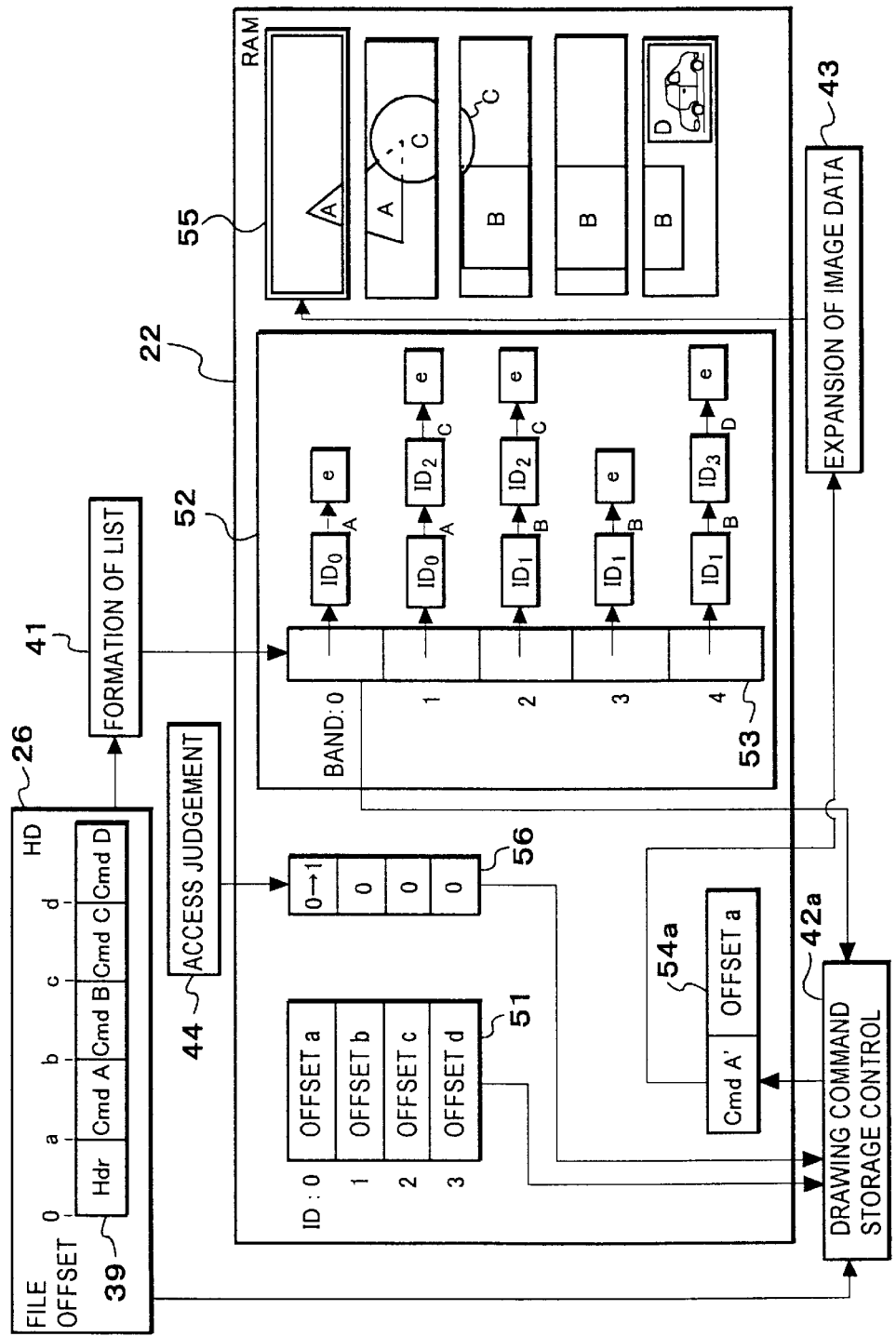
FIG. 4 is a block diagram illustrating the function of the printer host according to a second embodiment of the invention.

The effect of decreasing the quantity of data as a list cannot be understood from the comparison of the command-corresponded drawing command full list 53 of FIG. 4 with the drawing command difference list 53a of FIG. 5. This is because, for the purpose of simplicity, the image of one page has not been divided into five as shown in FIG. 9. In practice, the image of one page can be divided into very many number.

Figure 6:
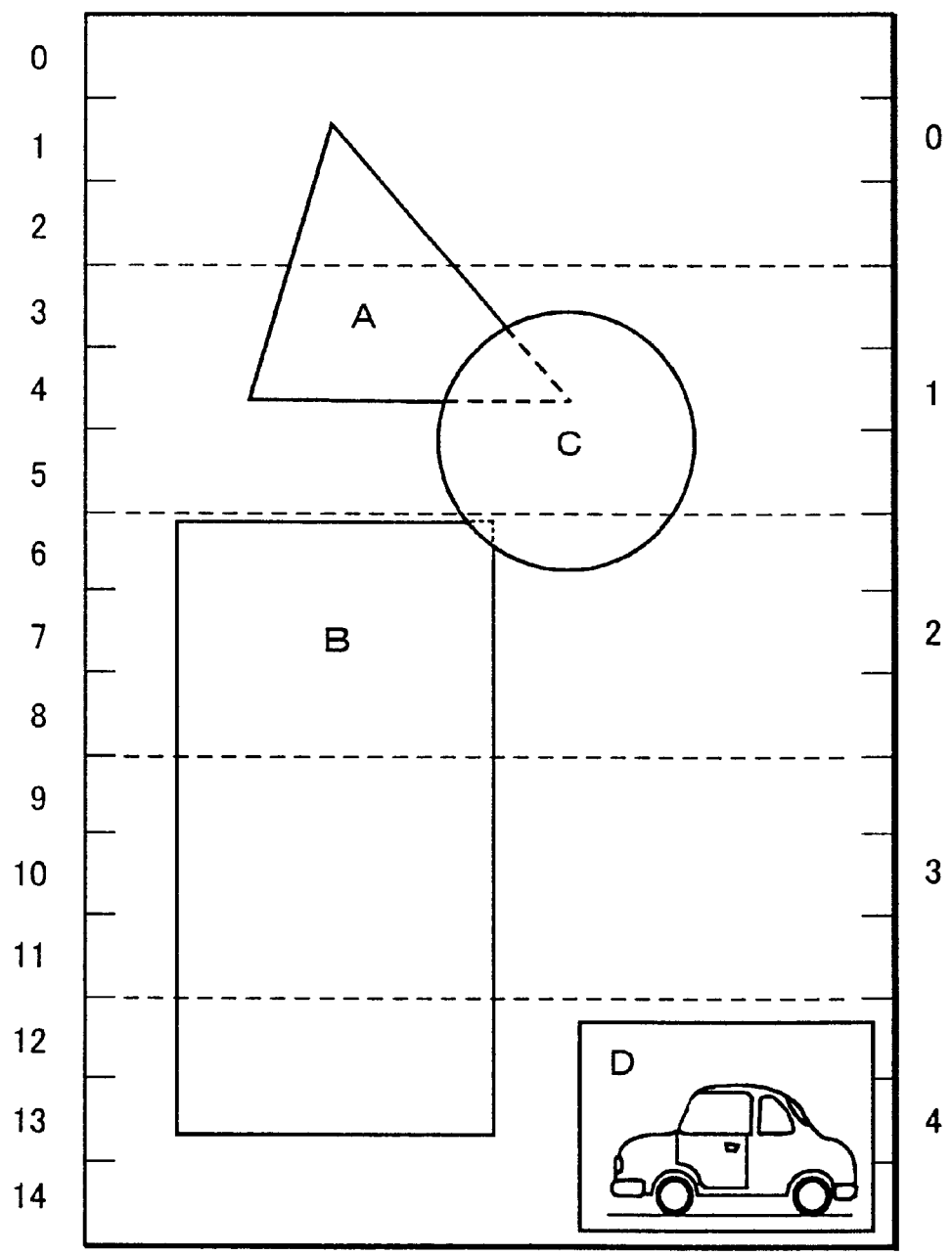
FIG. 6 is a diagram illustrating an image (divided into fifteen) of one page.

Referring, for example, to FIG. 6, one band mentioned above is further divided into three, so that the image of one page consists of 15 bands of from 0-th band to fourteenth band. When there are 15 bands, the total number of offset IDS of the drawing commands related to each of the band columns is 20 in the band-corresponded drawing command full list as shown in FIG. 7(A). In the drawing command difference list as shown in FIG. 7(B), on the other hand, the total number of offset IDs of the drawing commands related to the band columns is 8 which is equal to the total number of offset IDs in the drawing command difference list 53a shown in FIG. 5. This is because, the drawing command difference list does not relate all drawing commands to be expanded in the bands to all of the band columns, but is relates only the start and end of the drawing command to the band column.

In this embodiment, the one-band list 53b is provided in addition to the difference list 53a. However, the one-band list 53b is not substantially needed if there is used the difference list 53e. However, when, for example, the drawing command storage control unit 42a calls a drawing command related to the third band, it becomes necessary to make reference to the third band column and to the second band column when only the difference list 53a is available. In this case, therefore, it is desired to provide the one-band list 53b to facilitate the processing.

Though the embodiment is provided with the access judging unit 44 and the access judgement flag 56, the difference list 53a makes it possible to know whether the drawing command that is to be called by the drawing command storage control unit 42a is the one that is called for the first time or is the one that was once called or, in other words, whether it is necessary to access the hard disk device 26. Therefore, the access judging unit 44 and the access judgement flag 56 are not substantially necessary. Once the difference list 53a is formed, it is allowed to decrease the access number of times to the hard disk device 26 compared to that of the first embodiment even without providing the access judging unit 44 and the access judgement flag 56.

Figure 8:
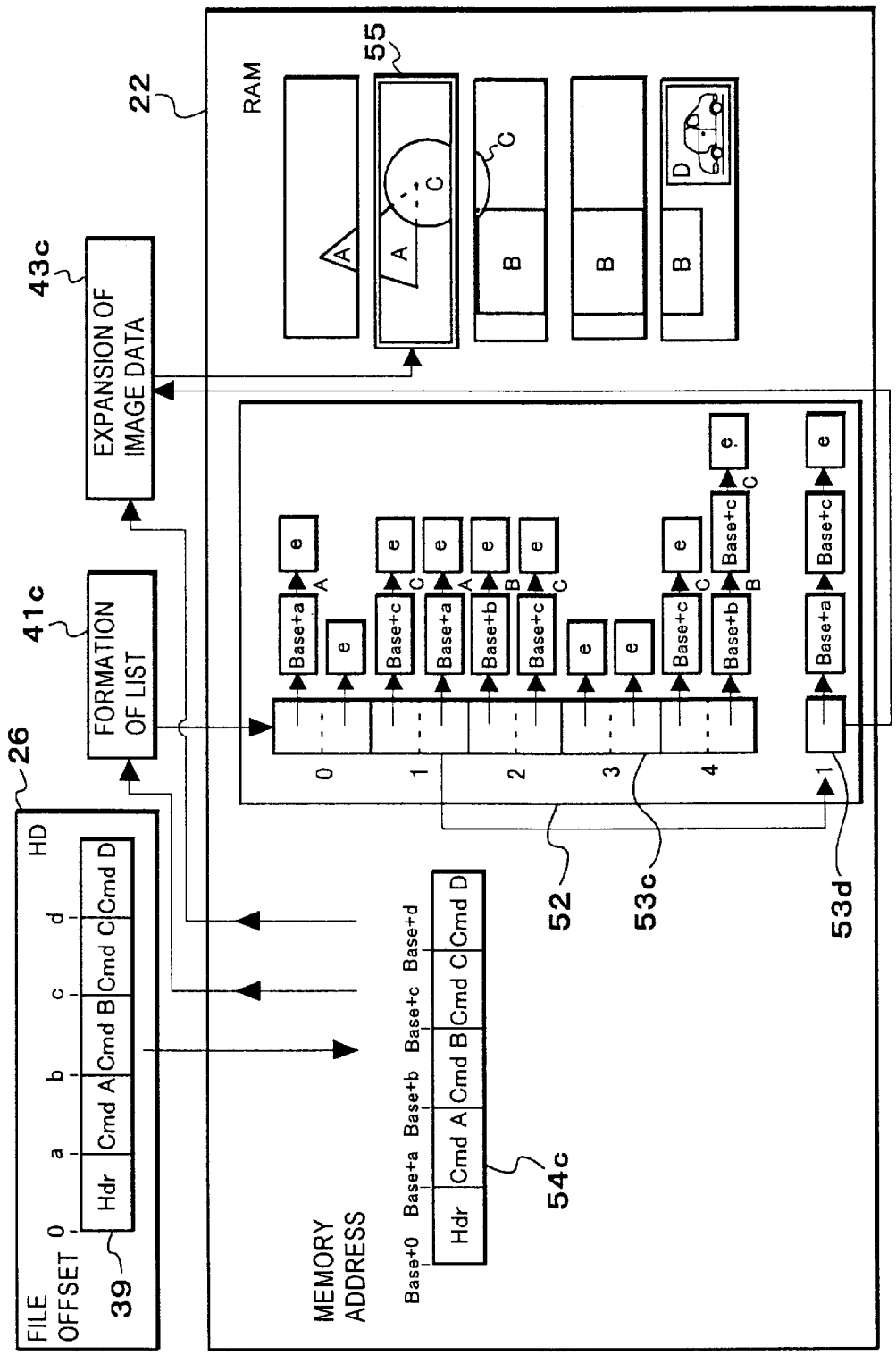
FIG. 8 is a block diagram illustrating the function of the printer host according to a fourth embodiment of the invention.

Next, the printer host according to the fourth embodiment of the present invention will be described with reference to FIG. 8.

According to the printer host of this embodiment in the same manner as in the prior art, the spool file 39 stored in the hard disk device 26 is copied into the RAM 22, a desired drawing command is called from the spool file copied into the RAM 22 and is expanded into an image. As hardware, the printer host of this embodiment has the same constitution as that of the first embodiment shown in FIG. 1, and is different from the first embodiment only in the functional constitution.

The host body includes a list-forming unit 41c for forming a drawing command difference list 53c and a one-band drawing command list 53d based on the spool file copied into the RAM 22, and an image data expanding unit 43c for calling a drawing command of a desired band from the spool file copied into the RAM 22 by making reference to the one-band drawing command list 53d, converting it into image data and expanding the image data in the band memory 55.

Next, operations of each of the functional units will be described next.

The spool file 39 stored in the hard disk device 26 is copied into the spool file memory (spool file storage region) 54c in the RAM 22 as described earlier. The list-forming unit 41c forms the drawing command difference list 53c and the one-band drawing command list 53d based on the spool file copied into the spool file memory 54c in the RAM 22. The drawing command difference list 53c and the one-band drawing command list 53d are basically the same as the drawing command difference list 53a and the one-band drawing command list 53b in the third embodiment, however, are different in that memory addresses of the drawing commands are related to each of the band columns, instead of offset IDs of the drawing commands.

When the one-band drawing command list 53d is formed, the image data expanding unit 43c makes reference to the one-band drawing command list 53d, calls a drawing command of a desired band from the spool file copied into the spool file memory 54a in the RAM 22, converts it into image data and expands the image data in the band memory 55.

As described above, in this embodiment, too, as the drawing command difference list 53c is employed, the quantity of data as a list can be reduced. In this embodiment, further, the spool file stored in the hard disk device 26 is directly copied at one time into the RAM 22, making it possible to greatly decrease the access number of times to the hard disk device 22. Besides, the drawing command storage control unit 42a, access judging unit 44, offset table 51 and drawing command memory 54b used in the third embodiment are no longer required in this embodiment.

In the foregoing embodiments, the offset table 51, list table 52, drawing command memories 54, 54a, spool file memory 54c and band memory 55 were formed in one RAM 22. They, however, may be formed being grouped into several RAMs.

What is claimed is:

1. A printer host which comprises an auxiliary storage unit and a main storage unit, and expands a bundle of drawing commands of one page stored, as a spool file, in the auxiliary storage unit, into image data for each of bands having a predetermined band width, the printer host further comprising:

list-forming means for forming a band-corresponded drawing command list showing correspondence of each of the drawing commands to the band or bands, by making reference to the spool file stored in the auxiliary storage unit;

drawing command storage region which is a portion of the main storage unit and stores therein the drawing command of one band;

an image data expanding region which is another portion of the main storage unit and in which the image data of one band is expanded;

drawing command storage control means which successively reads out the drawing commands corresponding to the respective bands from the spool file stored in the auxiliary storage unit according to the band-corresponded drawing command list, and stores the drawing command, of only one band that is read out, in the drawing command storage region; and image data expanding means which converts the drawing command of one band stored in the drawing command storage region into image data and expands the image data in the image data expanding region.

2. A printer host according to claim 1, further comprising:

access judging means which judges whether a drawing command among the plural drawing commands is the one that is once stored in the drawing command storage region or is the one that has not yet been stored in the drawing command storage region but has been stored in the auxiliary storage unit; wherein when it is judged by the access judging means that the drawing command is the one that has not yet been stored in the drawing command storage region but has been stored in the auxiliary storage unit, the drawing command storage control means makes reference to the band-corresponded drawing command list and accesses the auxiliary storage unit.

3. A printer host according to claim 1, wherein the list-forming means forms a drawing command difference list as the band-corresponded drawing command list, in which the start of a drawing command representing the image is related to the band corresponding to the start position of the image, and the end of the drawing command representing the image is related to the band corresponding to the end position of the image when each of the plural drawing commands is expanded into image.

4. A printer host according to claim 2, wherein the list-forming means forms a drawing command difference list as the band-corresponded drawing command list, in which the start of a drawing command representing the image is related to the band corresponding to the start position of the image, and the end of the drawing command representing the image is related to the band corresponding to the end position of the image when each of the plural drawing commands is expanded into image.

5. A printer host according to claim 3, wherein the list-forming means forms a one-band drawing command list as a portion of the band-corresponded drawing command list by making reference to the drawing command difference list, and in which the drawing commands corresponding to one band are all related to the band in which the image expansion is to be carried out, and the drawing command storage control means makes reference to the one-band drawing command list and stores the drawing command of one band in the drawing command storage region.

6. A printer host according to claim 4, wherein the list-forming means forms a one-band drawing command list as a portion of the band-corresponded drawing command list by making reference to the drawing command difference list, and in which the drawing commands corresponding one band are all related to the band in which the image expansion is to be carried out, and the drawing command storage control means makes a reference to the one-band drawing command list and stores the drawing command of one band in the drawing command storage region.

7. A storage medium used in a printer host which comprises an auxiliary storage unit and a main storage unit, the storage medium for storing a program which expands a bundle of drawing commands of one page stored, as a spool file, in the auxiliary storage unit, into image data for each of bands having a predetermined band width, the storage medium further storing the program which comprises the steps of:

forming a band-corresponded drawing command list showing correspondence of each of the drawing commands to the band or bands, by making reference to the spool file stored in the auxiliary storage unit;

successively reading out drawing commands corresponding to the respective bands from the spool file stored in the auxiliary storage unit, and storing in the drawing command storage region the drawing commands of only one band that is read out, the drawing command storage region being is a portion of the main storage unit for storing the drawing command of one band; and converting the drawing command of one band stored in the drawing command storage region into image data and expanding the image data in the image data expanding region which is another portion of the main storage unit for expanding the image data of one band.

8. A storage medium according to claim 7, wherein the storage medium stores a program comprising a step of:

judging whether a drawing command among the plural drawing commands is the one that is once stored in the drawing command storage region or is the one that has not yet been stored in the drawing command storage region but has been stored in the auxiliary storage unit; wherein when it is judged by the access judging step that the drawing command is the one that has not yet been stored in the drawing command storage region but has been stored in the auxiliary storage unit, the drawing command storage control step accesses the auxiliary storage unit.

9. A storage medium according to claim 7, wherein the storage medium stores a program comprising a step of forming a drawing command difference list as the band-corresponded drawing command list, in which the start of a drawing command representing the image is related to the band corresponding to the start position of the image, and the end of the drawing command representing the image is related to the band corresponding to the end position of the image when each of the plural drawing commands is expanded into image.

10. A storage medium according to claim 8, wherein the storage medium stores a program comprising a step of forming a drawing command difference list as the band-corresponded drawing command list, wherein the start of a drawing command representing the image is related to the band corresponding to the start position of the image, and the end of the drawing command representing the image is related to the band corresponding to the end position of the image when each of the plural drawing commands is expanded into image.

11. A printer host for expanding a bundle of drawing commands of one page stored as a spool file into image data for each of the bands having a predetermined band width, comprising:

list-forming means for forming a drawing command difference list in which the start of a drawing command representing the image is related to the band corresponding to the start position of the image, and the end of the drawing command representing the image is related to the band corresponding to the end position of the image when each of the plural drawing commands is expanded into image by making reference to the spool file;

an image data expanding region where the image data of one band are expanded; and drawing command processing means which successively reads out the drawing commands corresponding to the respective bands from the spool file based upon the drawing command difference list, and converts the drawing command of one band that is read out into image data to expand the image data in the image data expanding region.

12. A printer host according to claim 1, wherein:

the list-forming means forms a one-band drawing command list by making reference to the drawing command difference list, in which the drawing commands corresponding to one band are all related to the band in which the image expansion is to be carried out; and the drawing command processing means makes reference to the one-band drawing command list to convert the drawing command of one band into image data, and expands the image data in the image data expanding region.

13. A storage medium storing a program for expanding a bundle of drawing commands of one page stored as a spool file into image data for each of the bands having a predetermined band width, the program comprising the steps of:

forming a drawing command difference list in which the start of a drawing command representing the image is related to a band corresponding to the start position of the image, and the end of the drawing command representing the image is related to a band corresponding to the end position of the image when each of the plural drawing commands is expanded into image by making reference to the spool file; and successively reading out the drawing commands corresponding to the respective bands from the spool file based upon the drawing command difference list, converting the drawing command of one band that is read out into image data, and expanding the image data in the image data expanding region.

14. A storage medium according to claim 13, wherein:

the list-forming step forms a one-band drawing command list in which the drawing commands corresponding one band are all related to the band in which the image expansion is to be carried out; and the drawing command processing step expands the drawing command of one band into image data and expands the image data in the image data expanding region by making reference to the one-band drawing command list.

* * * * *